April 2, 1935.   C. E. SMITH   1,996,595
DISAPPEARING TOP CONSTRUCTION
Filed Aug. 29, 1932   2 Sheets-Sheet 1
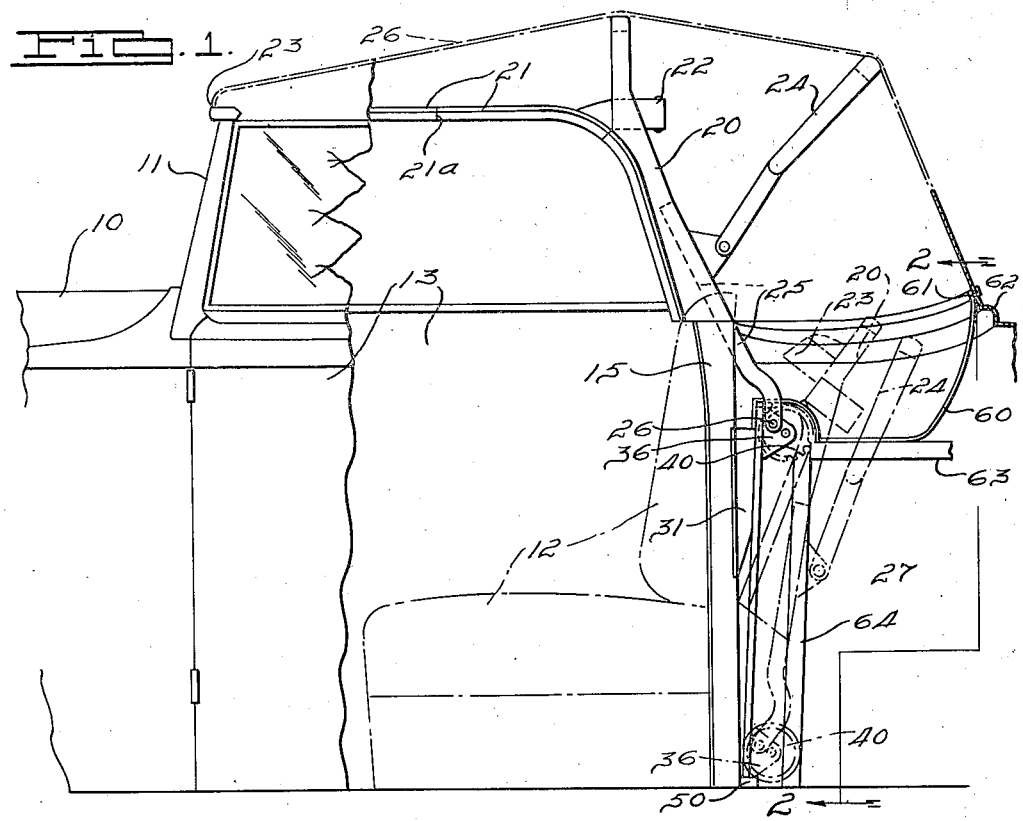
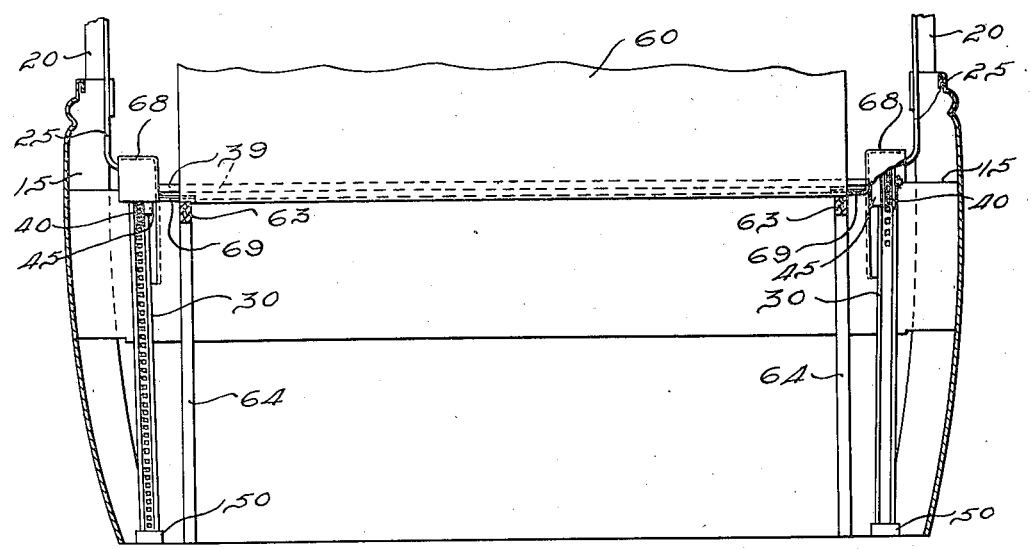
INVENTOR
Chris E. Smith.
BY
ATTORNEYS.

April 2, 1935. C. E. SMITH 1,996,595
DISAPPEARING TOP CONSTRUCTION
Filed Aug. 29, 1932 2 Sheets-Sheet 2
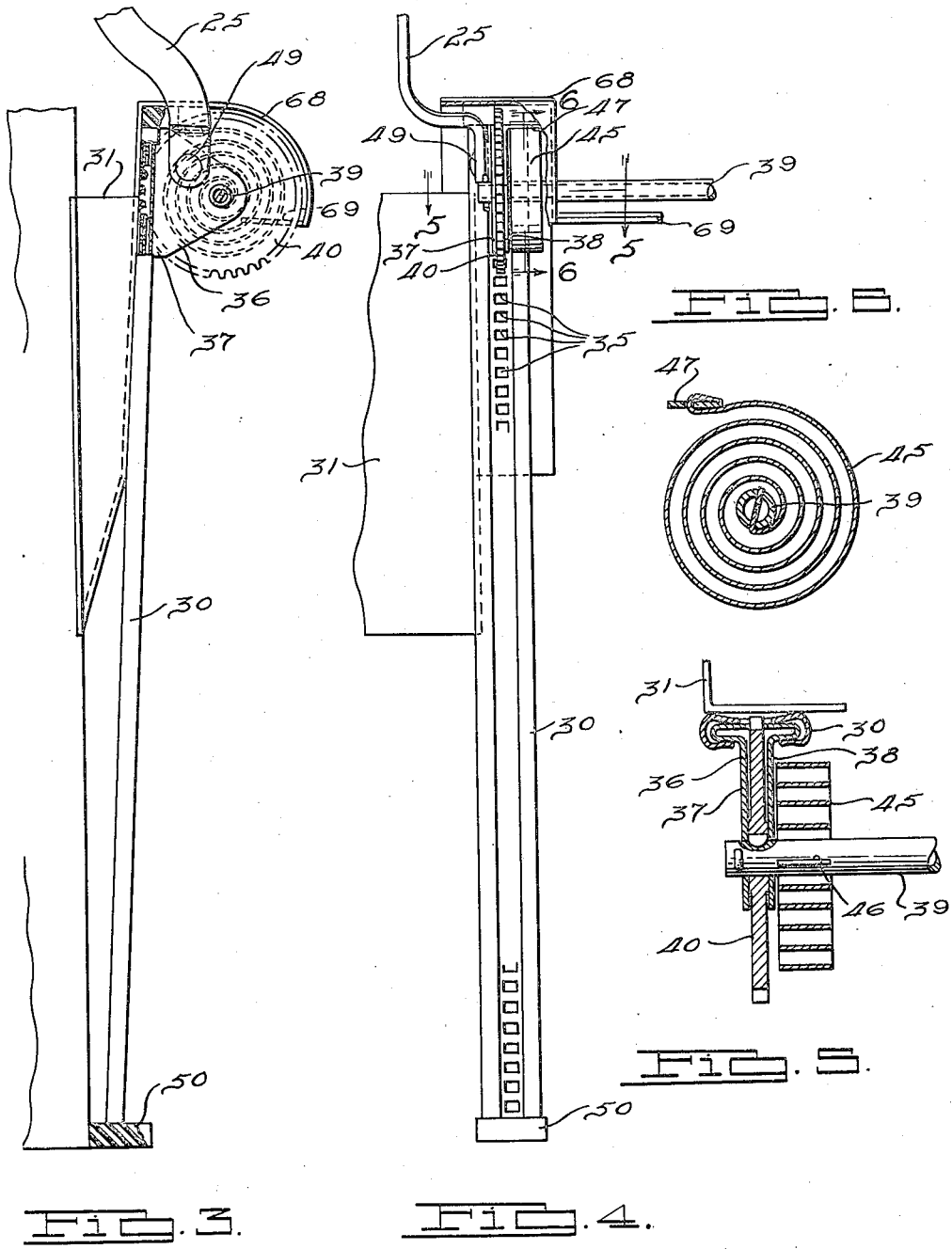
INVENTOR
Chris E. Smith.
BY
ATTORNEYS.

Patented Apr. 2, 1935

1,996,595

UNITED STATES PATENT OFFICE 1,996,595

DISAPPEARING TOP CONSTRUCTION

Chris E. Smith, Detroit, Mich., assignor to The Murray Corporation of America, a corporation of Delaware Application August 29, 1932, Serial No. 630,855

4 Claims. (Cl. 296—107)

My invention relates to new and useful improvements in collapsible top constructions for vehicle bodies.

One object of the invention is to provide means for mounting and manipulating a collapsible top to a vehicle body, so that the same may be completely stored within the confines of the body and out of sight when not in use.

Another object is to provide a novel means for mounting and raising and lowering a collapsible top relative to a storage compartment within the vehicle body.

Another object of the invention is to provide in combination with a storage compartment for a collapsible top, novel means for mounting and supporting said top which will enable it to be moved in and out of said compartment with a minimum of manual aid.

Other objects and features of novelty of my invention will be either specifically pointed out or will become apparent, when referring for a better understanding of my invention, to the following description in conjunction with the accompanying drawings, wherein:

Figure 1 is a side elevational view of the passenger compartment of a vehicle body and a collapsible top embodying my invention. Part of the construction is broken away to better illustrate the details, and the collapsible top is shown in its raised position in the full lines and in its folded and concealed position in the dotted lines.

Figure 2 is a sectional view taken on the line 2—2 of Figure 1.

Figure 3 is a side elevational view of the mechanism upon which the collapsible top is mounted and by means of which it is raised and lowered relative to the storage compartment in the vehicle body, parts of the figure being broken away to better illustrate the details of the construction.

Figure 4 is a rear elevational view of the mounting device shown in Figure 3 with parts broken away to disclose the details of the construction.

Figure 5 is a sectional view taken on line 5—5 of Figure 4, and

Figure 6 is a sectional view taken on line 6—6 of Figure 4.

There has been considerable difficulty in providing storage for the collapsible tops in automobile bodies when the tops are not in use. The problem has been to conceal as much of the entire top structure as possible and to place it in a small and convenient compartment. I have overcome difficulties previously encountered by providing a novel mounting for a collapsible top construction by means of which the top, when folded to a flat, compact bundle, may be lowered into a narrow and relatively deep compartment where it is completely concealed and out of the way. This mounting is also constructed and arranged so that the top may be raised from the compartment with a minimum of manual effort.

Referring to Figure 1 of the drawings, the numeral 10 indicates generally the vehicle body which, for the purpose of illustration, is shown as a conventional two passenger body having a windshield 11 at the forward end of the passenger compartment, having a seat 12 arranged transversely of the passenger compartment, and doors 13 at each side of the compartment. The windshield 11 is provided with solid framing at each side which reaches from the top of the body to the top of the windshield.

A collapsible top is provided which comprises a main bow member 20 pivotally mounted at its lower end upon a mechanism which will be hereinafter described. Extending forwardly from the upper portion of this bow member at each side thereof are side rails 21 which are in two parts, the forward and rear parts being joined by a hinge 21a with a vertically disposed pintle. The rear part of the side rails is hinged to the main bow member 20, as indicated at 22. The forward end of the side rails are pivotally attached in conventional manner to a front header or cross member 23 which lies above the top of the windshield and may be secured along the top of the windshield frame by any suitable releasable means. To the intermediate portion of the main bow member 20 is pivotally attached a rear bow member 24 which normally extends rearwardly from the main bow at an angle as shown when the top is in raised position. The main bow member 20 is provided with a strap iron extension 25 which extends downwardly to the side and rear of the said seat back 12 and is pivotally connected, as at 26, to a bracket which is mounted to move vertically along a suitable track at the rear of the seat. It will be understood that the opposite side of the bow member 20 is likewise constructed and secured. A flexible cover 26 is secured at its forward edge along the forward edge of the header member 23, and is releasably secured, by conventional snap fasteners or other suitable means, at its rear and side edges to the sides of the bow 20 and the top edge of the body which surrounds a compartment 27 at the rear of the seat 12.

Mechanism for supporting the top structure and for raising and lowering it relative to the compartment 27 is provided in that compartment and comprises, as shown in Figures 2 to 6 inclusive, vertically disposed channel shaped track members 30 positioned on opposite sides of the body and adjacent the rear door posts 15. A cross section of this channel shaped track is shown in Figure 5. The tracks may be secured to the door posts by means of angle shaped stampings 31, one flange of which is secured to the track 30 by welding or riveting or other suitable means, and the other flange of which is secured to the door posts by means of nails or screws or any suitable means. The lower ends of the tracks 30 may be flanged out laterally and secured to the under frame members or sills of the body by nails or screws.

Referring to Figure 5, it will be noted that the bottom of the channel shaped track 30 is bowed inwardly somewhat and is provided with spaced apertures 35 throughout its length. A complementary track member 36 is provided to fit within and slide relative to the track member 30 and comprises, as shown in Figure 5, a T-shaped member having its lateral flanges engaging under the inturned flanes on the free edges of the track member 30 and having its stem portion extending outwardly at right angles to the bottom of the track member 30. This member 36 is preferably formed of sheet metal which is return-bent to provide a hollow box section structure for the lateral flanges and to provide two spaced members 37 and 38 for the outwardly extending stem. These members 37 and 38 form a bracket, one side of which is shown in Figure 3 and the outer end of this bracket supports a shaft 39 which extends from one track to the other. On the ends of this shaft 39 are mounted toothed wheels 40 which are positioned between the outwardly extending members 37 and 38. The teeth of these wheels 40 work through a slot in the head of the member 36 which registers with the spaced apertures 35 in the bottom of the track 30 and thereby maintain the track member 36 in positive predetermined positions relative to the track 30. Attached to the shaft 39 at each end and just inside the member 36 is a flat coiled counterbalance spring 45. One end of this spring is inserted through a slot 46 in the shaft 39 and the other end is attached to a laterally extending flange 47, Figure 6, provided upon the upper edge of the part 38 of the member 36.

It will be understood that the construction described in singular as to member 36 and its component parts, and shaft 39, toothed wheel 40 and spring 45, is identical at both ends of the shaft 39. The spring 45 is so arranged that it will wind up as the shaft moves downwardly along the track 30 and will therefore exert its force to move the shaft upwardly along the track 30 when permitted to do so.

The strap iron extensions 25 attached to the main bow 20 are bent and pivotally secured as at 49, Figures 3 and 4, to the outer side wall 37 of the track member 36. This pivotal connection may consists of a rivet extending through the end of the member 25 and through the member 37. These strap iron extensions 25 are bent to lie along the inside of the rear door posts 15, as indicated in Figure 1, or to fit within slots cut in the rear edge of the door posts. The bow member 20 is usually made of wood and its lower end is adapted to fit and rest upon the tops of the rear door posts 15 when the main bow is in raised position. It will also be noted that the forward edge of the main bow 20 overhangs the forward edge of the rear door post 15 and may be provided with weather stripping to accommodate the edge of a vertical, slidable window glass which may be mounted in the door 13.

It will be noted that the track members 36 which support the shaft 39, the wheels 40 and the springs 45, are retained in position relative to the track member 30 by means of the bearing of the inturned edges of the track member 30 against the lateral flanges of the T-shaped track member 36. It may be desirable in mounting the tracks 30 in the body to position them so that looking downwardly they converge slightly toward one another. This insures just enough binding effect between the shaft 39, the toothed wheels 40, the track member 36 and the track member 30 to eliminate rattles.

It will also be especially observed that by providing the apertures 35 in the track 30 and corresponding slot in the track member 36, and the toothed wheel 40, the teeth of which extend through the apertures in both members 36 and 30, eliminates the possibility of one side of the shaft lowering or rising more rapidly than the other and causing the parts to bind. By means of the arrangement described, each end of the shaft is held in definite predetermined position relative to the other end of the shaft and to the tracks 30.

Rubber bumper members 50 are positioned at the lower ends of the tracks 30 and provide a stop and a noiseless cushion for supporting the toothed wheels 40 and the track member 36 when in their lowermost position.

A panel 60, Fig. 1 and 2, is positioned in the upper part of the compartment 27, with its upper edge joined at 61 by welding or crimping to edge of the deck panel 62, and having its lower side edges resting upon and secured by nails or screws to the horizontal framing members 63 which are supported at their forward ends by upright framing members positioned to the rear of the rear seat and inside the track members 30. The rear ends of the framing members 63 are attached to the other framing in the rear of the body, not shown. The panel 60 forms a support for the free edges of the top cover material when the bows are folded and as a storage shelf for miscellaneous articles. The framing members 63 and 64 are spaced inwardly from the side panels of the body, Fig. 2, a sufficient distance to provide clearance for the ends of the bow members 20 and 24 when the track members 36 are lowered to the ends of the tracks 30.

Housing members 68, Fig. 2, are provided for the upper ends of the tracks 30, and are provided with side flanges 69 which are secured by nails or screws, not shown, to the framing members 63. These housings 68 serve to conceal and protect the track and its attendant mechanism, and also provide a stop to limit the upward movement of the movable member 36 and its attachments.

In operation the rear and side edges of the cover material 26 are released from the edge of the body around the compartment 27 at the rear of the seat and pushed inside the edges of this compartment. The header member 23 is released from the windshield and moved rearwardly toward the main bow 20. The side rails 21 fold inwardly and pivot relative to the main bow 20 in a conventional manner permitting the header 23 to be folded back against the main bow. The main bow is then tipped rearwardly to clear the back of the front seat and the rear bow is folded up against the main bow. The whole assembly is then pushed downwardly thus causing the toothed wheels 40 on each end of the shaft 39 to move downwardly along the tracks 30 until the entire collapsed top assembly is contained within the compartment at the rear of the seat, as shown in the dotted lines in Fig. 1. As the top is shoved down into the compartment forcing the toothed wheels 40 downwardly along the tracks 30, the springs 45 are wound up reaching a point of greatest tension when the wheels 40 are at the bottom of the tracks 30. This tension is arranged to substantially counterbalance the weight of the top assembly, which may be secured in the compartment by any suitable locking means or by placing a cover over the top of the compartment. When it is desired to raise the top it is only necessary to take hold of the top of the main bow 20 and exert a light lifting effort. The springs 45 will then rotate the shaft 39 and urge the wheels 40 upwardly along the track 30 and elevate the entire collapsed structure to its top position with very little effort. The top may then be unfolded and secured over the top of the passenger compartment.

While I have described and illustrated several embodiments of my invention, it will be apparent to those skilled in the art that various changes, omissions, additions and substitutions may be made therein without departing from the spirit and scope of my invention, as set forth in the accompanying claims.

I claim:

1. In an automobile body, a passenger compartment, a storage compartment at the rear of said passenger compartment, a collapsible top for covering said passenger compartment, and means in said storage compartment for raising and lowering said top in folded condition relative to the interior of said storage compartment, said means comprising vertically disposed tracks having spaced apertures therein, complemental track members slidable in said tracks having an aperture therein registerable with the apertures in said tracks, said complementary track members being secured to said collapsible top, toothed wheels supported in said complemental track members and positioned for rotation therein with their teeth extending through the aperture in said complemental track members and the spaced apertures in said tracks, a shaft connecting said complemental track members and said toothed wheels for maintaining the same in aligned horizontal position, tension spring means attached to said complemental track members and said shaft operable to counterbalance the weight of said top structure.

2. The combination with an automobile body having a passenger compartment and a storage compartment adjacent to each other, of a collapsible top for said passenger compartment having an arm on each of the sides extending into said storage compartment, a track substantially vertically disposed in said compartment, brackets on said tracks, interconnecting means for said brackets, gears provided on the end of said interconnecting means engaging apertures in said track for turning said interconnecting means and for retaining said brackets in aligned relation, and pivots connecting said brackets to said arms, whereby the top when collapsed may be lowered into said compartment.

3. The combination with an automobile body having a passenger compartment and a storage compartment adjacent to each other, of a collapsible top for said passenger compartment having an arm on each of the sides extending into said storage compartment, a pair of tracks disposed in said compartment, brackets on said tracks, interconnecting means for said brackets, gears provided on the end of said interconnecting means engaging apertures in said track for turning said interconnecting means and for retaining said brackets in aligned relation, pivots connecting said brackets to said arms, and spring means tensioned by the turning of said interconnecting means for applying a bias against said downward movement.

4. The combination with an automobile body having a passenger compartment and a storage compartment adjacent to each other, of a collapsible top for said passenger compartment having an arm on each of its sides extending into said storage compartment, spaced tracks substantially vertically disposed in said storage compartment, a slidable element on each said track, means wholly within said storage compartment for retaining said elements in horizontal alignment, and pivots within said compartment connecting the slidable elements to said arms.

CHRIS E. SMITH.